July 2, 1929.  G. A. FISHER  1,719,760
PACKAGE OF EVAPORATED MILK AND METHOD OF PRODUCING THE SAME
Filed Nov. 7, 1927
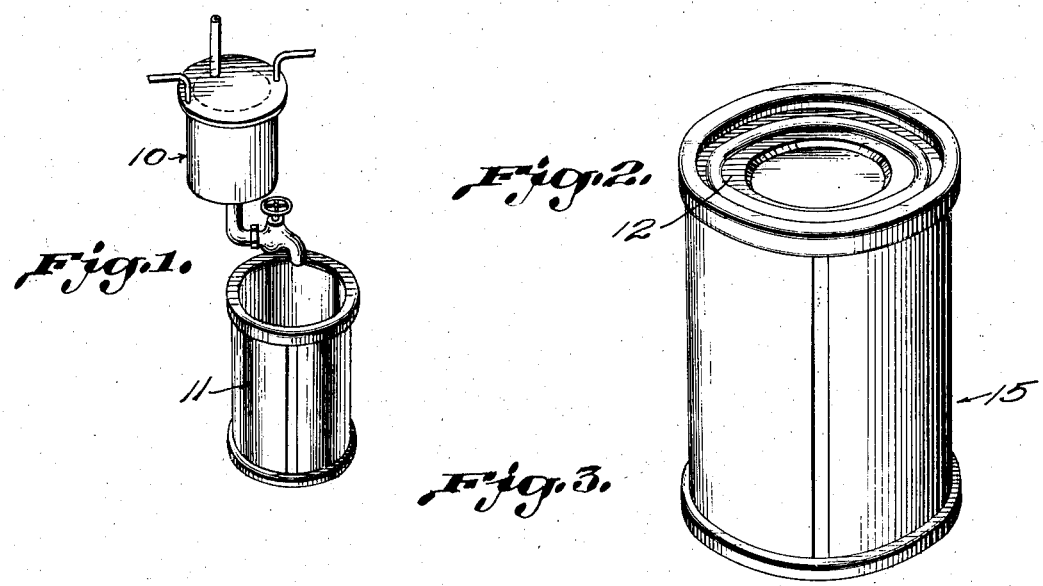
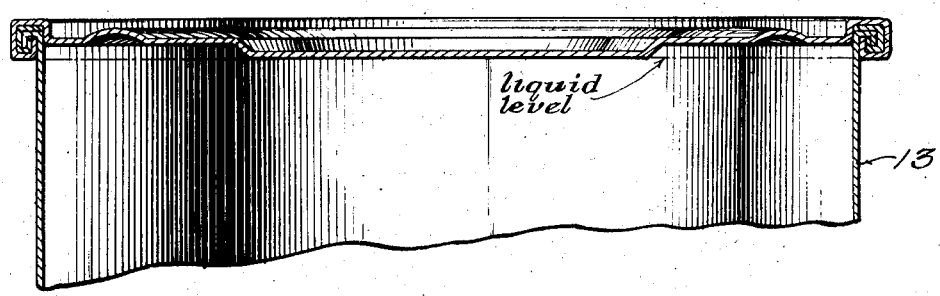
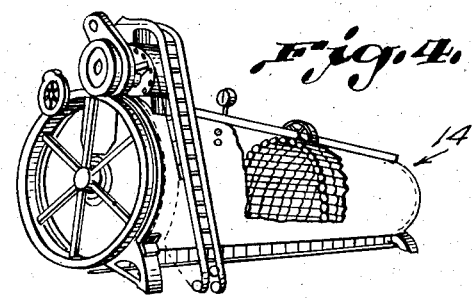
Inventor
George A. Fisher,
Hood & Hahn.
Attorneys Patented July 2, 1929.

1,719,760

UNITED STATES PATENT OFFICE.

GEORGE A. FISHER, OF INDIANAPOLIS, INDIANA.

PACKAGE OF EVAPORATED MILK AND METHOD OF PRODUCING THE SAME.

Application filed November 7, 1927. Serial No. 231,575.

At the present time the commercial production of canned evaporated milk is substantially as follows:

The raw milk is introduced into a vacuum pan and there subjected to heat until the desired proportion of water content has been removed. The reduced liquid is then introduced into cans of desired capacity, said cans being of the solder-sealed type. Because of the unavoidable foaming of the liquid when introduced into the cans, and because of the necessity of avoiding exudation of the liquid from the can during the process of solder-sealing, the quantity of liquid introduced into the cans is substantially less than the sealed capacity of the cans, the filling being approximately 90% of the sealed capacity. The commercially filled cans are thereupon solder-sealed and the sealed cans then subjected to a sterilizing heat for the necessary period and, upon cooling, the processed packages are subjected to a shaking operation by means of which the liquid content is agitated to make it homogeneous.

In carrying out the sterilizing step of the above described process it has been found that the best results are attained by avoiding agitation of the liquid content during the sterilizing period because a critical condition of the liquid is reached, at the close of the sterilizing period, where proper coagulation of the liquid content is attained.

Attempts have heretofore been made to accomplish the sterilization by means of so-called continuous sterilization wherein the partially filled and sealed cans are introduced in succession and continuous series into one end of the sterilizing apparatus and carried progressively therethrough, but, because of unavoidable substantial agitation of the liquid contents it has been found that proper coagulation is not attained by such continuous sterilization.

When evaporated milk has been treated in the manner described above it is well known that, upon standing for considerable periods, there is a gradual deterioration of the milk in taste and color; a gradual progressive fat separation, evidenced by the appearance of a streaky film upon the upper surface; and a gradual oxidation of the inner tinned faces of the can, both those above the upper surface of the liquid and those submerged by the liquid, and this gradual oxidation seriously affects the taste and color of the milk.

It has also been found that the deterioration described above is hastened by such handling of the cans as results in substantial agitation of the contents.

I have discovered that if the cans be filled with the evaporated milk coming from the vacuum pan substantially to their sealed capacity and the cans thereupon sealed, they may be successfully sterilized by a sterilization process which involves movement through the apparatus, and that the contents will properly coagulate in spite of the unavoidable agitation due to the passage of the cans through the sterilizer; that the liquid does not need a subsequent shaking treatment; and that packages so treated may stand for long periods of time and may be transported without care to avoid agitation, without fat separation by any indication thereof by the appearance of the film mentioned above, and that the submerged and exposed inner walls of the cans do not appreciably oxidize, so that when packages of evaporated milk are produced in accordance with my discovery there will be delivered to the customer, even after long standing and much transportation, an evaporated milk which is greatly superior in texture (thicker and creamier) and taste than has heretofore been commercially possible.

I have found that, when heat sterilization of an evaporated milk is attempted under conditions which involve substantial content-agitating movement of the cans during sterilization, there is a critical relation between the sealed capacity of the can and the volume of liquid content; and that this critical relation is reached when the liquid content is approximately 97.27% of the sealed capacity of the can.

In other words, I have found that, if a can containing a volume of properly evaporated milk less than 97.27% of the sealed capacity of the can, is subjected to heat sterilization which involves concurrent agitation, it is not possible to cause the milk to properly coagulate so as to attain a proper consistency and avoid fat separation and oxidation, but that, if the volume of milk be 97.27% or more of the sealed capacity of the can, heat sterilization which involves concurrent agitation will result in a proper coagulation of the milk and that packages so treated will not internally oxidize and the milk will retain its desired texture, taste and condition for much longer periods of time than has heretofore been possible.

As previously stated, it is not commerically practicable, so far as I now know, to fill solder-sealed cans to the necessary extent but mechanically sealed cans of a type commonly now in use for other products, are capable of such filling.

The accompanying drawings illustrate diagrammatically my discovery.

Fig. 1 is a perspective view showing an empty can in position for filling; Fig. 2 a perspective of a filled can; Fig. 3 a fragmentary vertical section of a desirable form of can, and Fig. 4 a diagrammatic view of a continuous sterilizing apparatus.

In the drawings 10 indicates a vacuum pan, 11 a can to receive the vaporated milk, 12 a cover for can 11, 13 the filled and sealed can in section, 14 a sterilizer of the continuous type, and 15 the completed article of commerce.

The specific construction of the can may, of course, be varied to a considerable extent without affecting my process but it must be such that it may, by commercially practicable methods, be capable of receiving the desired relative volume of the evaporated milk and subsequently sealed without decrease of that relative volume below the critical relation. The specific constructions of vacuum pan and sterilizer, of course, form no part of my discovery.

One of the methods of determining desired viscosity of an evaporated milk is by learning the time required for 100 cu. centimeters of the liquid to pass through a calibrated pipette from which 100 cu. centimeters of distilled water will flow in 34 seconds. Commercially it is required that the evaporated milk shall have such viscosity that 100 cu. centimeters of such milk will require at least 43.8 seconds to flow through such a calibrated pipette, and commercially it is preferred that the evaporated milk shall be sufficiently viscous to require in the neighborhood of 45 seconds of such flow.

The following table illustrates the critical volumetric relation between the sealed capacity of the container and the liquid, on the one hand, and the viscosity attainable by a heat sterilization with concurrent agitation of the packages to the passage of the packages through a continuous sterilizer.

| Sealed capacity of can | Volume of liquid | Volumetric per cent | Viscosity in pipette seconds |
| --- | --- | --- | --- |
| 14.734 fl. oz. | 14.62 | 99.23 | 45.0 |
| 14.734 fl. oz. | 14.42 | 97.86 | 45.0 |
| 14.734 fl. oz. | 14.33 | 97.27 | 42.5 |
| 14.734 fl. oz. | 14.24 | 96.62 | 42.9 |
| 14.734 fl. oz. | 14.15 | 96.04 | 42.9 |
| 14.734 fl. oz. | 14.06 | 95.45 | 42.7 |
| 14.734 fl. oz. | 13.97 | 94.80 | 42.4 |
| 14.734 fl. oz. | 13.88 | 94.21 | 42.2 |
| 14.734 fl. oz. | 13.79 | 93.57 | 41.6 |
| 14.734 fl. oz. | 13.70 | 92.97 | 42.0 |
| 14.734 fl. oz. | 13.60 | 92.33 | 41.5 |
| 14.734 fl. oz. | 13.52 | 91.74 | 41.3 |

I claim as my invention:

1. The improved process of producing commercial packages of evaporated milk which comprises filling a can with such milk to approximately 97.27 per cent capacity, sealing and heat sterilizing during concurrent agitation of the can.

2. The improved process of producing commercial packages of evaporated milk which comprises filling a can with such milk to at least 97.27% of its sealed capacity, sealing and heat sterilizing during concurrent agitation of the can.

3. As an article of manufacture, a sealed can filled to at least 97.27% of its sealed capacity with a heat-coagulated evaporated milk of a smooth creamy consistency substantially fat-retaining and the internal surfaces of the can substantially non-oxidized upon aging.

4. As an article of manufacture, a mechanically sealed can filled to at least 97.27% of its sealed capacity with a heat-coagulated evaporated milk of a smooth creamy consistency substantially fat-retaining and the internal surfaces of the can substantially non-oxidized upon aging.

5. As an article of manufacture, a sealed can filled approximately 97.27% of its sealed capacity with a heat-coagulated evaporated milk of a smooth creamy consistency substantially fat-retaining and the internal surfaces of the can substantially non-oxidized upon aging.

6. As an article of manufacture, a mechanically sealed can filled approximately 97.27% of its sealed capacity with a heat-coagulated evaporated milk of a smooth creamy consistency substantially fat-retaining and the internal surfaces of the can substantially non-oxidized upon aging.

In witness whereof, I have hereunto set my hand at Indianapolis, Indiana, this 5th day of November, A. D. one thousand nine hundred and twenty-seven.

GEORGE A. FISHER.